(12) United States Patent
Talreja et al.

(10) Patent No.: US 12,493,797 B2
(45) Date of Patent: Dec. 9, 2025

(54) MULTI-LEVEL TIME SERIES FORECASTING USING ARTIFICIAL INTELLIGENCE TECHNIQUES

(71) Applicant: Dell Products L.P., Round Rock, TX (US)

(72) Inventors: Kailash Talreja, Mumbai (IN); Kuruba Ajay Kumar, Andhra Pradesh (IN); Saurabh Jha, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 870 days.

(21) Appl. No.: 17/742,747

(22) Filed: May 12, 2022

(65) Prior Publication Data

US 2023/0368035 A1 Nov. 16, 2023

(51) Int. Cl.
*G06N 3/088* (2023.01)

(52) U.S. Cl.
CPC .................................. *G06N 3/088* (2013.01)

(58) Field of Classification Search
None
See application file for complete search history.

(56) References Cited

U.S. PATENT DOCUMENTS

| | | |
|---|---|---|
| 9,378,200 B1 | 6/2016 | Cohen et al. |
| 9,672,279 B1 | 6/2017 | Cohen et al. |
| 10,127,304 B1 | 11/2018 | Cohen et al. |
| 10,235,452 B1 | 3/2019 | Savir et al. |
| 10,803,399 B1 | 10/2020 | Cohen et al. |
| 11,281,969 B1* | 3/2022 | Rangapuram ............ G06N 7/01 |
| 2017/0337487 A1* | 11/2017 | Nock ...................... G06N 20/00 |
| 2020/0265192 A1* | 8/2020 | Lin ........................ G06N 3/044 |
| 2021/0241929 A1* | 8/2021 | Vishwakarma ........ G16Y 40/20 |

(Continued)

OTHER PUBLICATIONS

Wikipedia, Robotic process automation, https://en.wikipedia.org/w/index.php?title=Robotic_process_automation&oldid=1084045031, Apr. 22, 2022.

(Continued)

*Primary Examiner* — Mandrita Brahmachari
(74) *Attorney, Agent, or Firm* — Ryan, Mason & Lewis, LLP

(57) ABSTRACT

Methods, apparatus, and processor-readable storage media for multi-level time series forecasting using artificial intelligence techniques are provided herein. An example computer-implemented method includes determining entity-related features and temporal features from at least a portion of one or more sets of time series data pertaining to at least one entity; creating multiple embeddings by encoding at least a portion of the entity-related features and at least a portion of the temporal features using at least one artificial intelligence-based embedding technique; processing the multiple embeddings using at least one neural network-based attention technique; generating one or more data forecasts across one or more temporal granularity levels by processing at least a portion of results from the processing of the multiple embeddings using at least one artificial intelligence-based categorization technique; and performing one or more automated actions based at least in part on the one or more data forecasts.

20 Claims, 10 Drawing Sheets

(56) References Cited

U.S. PATENT DOCUMENTS

2022/0108195 A1* 4/2022 Kehler .................. G06N 3/047
2022/0121921 A1* 4/2022 Chen ..................... G06Q 10/10

OTHER PUBLICATIONS

Wikipedia, ABBYY Fine Reader, https://en.wikipedia.org/w/index.php?title=ABBYY_FineReader&oldid=1082321823 , Apr. 12, 2022.
Wikipedia, Alteryx, https://en.wikipedia.org/w/index.php?title=Alteryx&oldid=1078943432 , Mar. 24, 2022.
Wikipedia, Microsoft Azure, https://en.wikipedia.org/w/index.php?title=Microsoft_Azure&oldid=1085299553 , Apr. 29, 2022.
Entrinsik.com, https://entrinsik.com/informer/ , May 5, 2022.
Wikipedia, Long short-term memory, https://en.wikipedia.org/w/index.php?title=Long_short-term_memory&oldid=1085879235 , May 2, 2022.
Wikipedia, Autoregressive integrated moving average, https://en.wikipedia.org/w/index.php?title=Autoregressive_integrated_moving_average&oldid=1086361303 , May 5, 2022.
Nishida, K., Exploratory.io, An Introduction to Time Series Forecasting with Prophet in Exploratory, Apr. 12, 2017.
Rigby, J., TowardsDataScience.com, AddressNet: How to build a robust street address parser using a Recurrent Neural Network, Dec. 5, 2018.
Github.com, Libpostal, https://github.com/openvenues/libpostal , May 5, 2022.

* cited by examiner

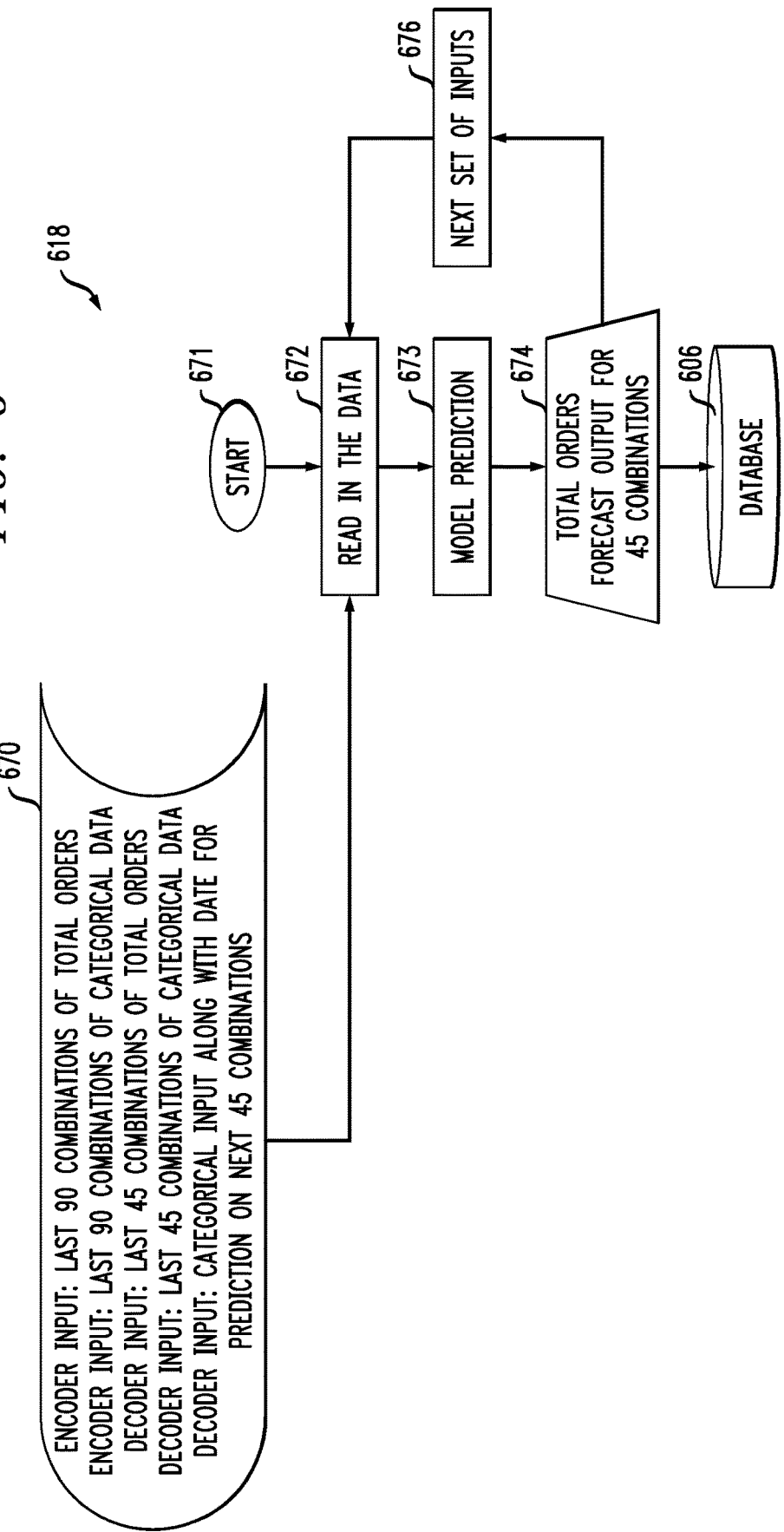

FIG. 7
700

Initialize:
    Input sequence length to the encoder => inp_enc_len
    Input sequence length to the decoder => out_dec_len
    Split size for the start of sequence to the decoder => split_len
    Define embed dimension => embed_dim
    batch_size Given:
    EncoderInput : (batch_size x [0:inp_enc_len] x embed_dim)
    DecoderInput : (batch_size x [split_len:out_dec_len] x embed_dim)

Model Encoder:
    Output_intersample = IntrasampleAttention(EncoderInput) ##Output shape is 1 x batch_size x input_enc_len
    Transposed_vector = Transpose(output_intersample) ##Output shape into batch_size x input_enc_len x 1
    Output_feedforward = FeedForwardNeuralNetwork(transposed_vector) ##Output_feedforward is batch_size x input_enc_len x embed_dim
    Noise_filtered_vector = batchmultiplication(EncoderInput, Ouput_feedforward)

DownSampling
    Output_feedforward = FeedForwardNeuralNetwork(Noise_filtered_vector) ##Output_feedforward is batch_size x input_enc_len x (embed_dim/4)
    Key_vector_encoder, Value_vector_encoder = Eigenvaluebasedattention(Output_feedforward)

Model Decoder:
    Decoder_input = Mask(DecoderInput)
    outputmultiheaddecoder = EigenvaluebasedAttention(Key_vector_encoder, Value_vector_encoder, Decoder_input)
    FeedForwardoutput = FeedForwardNeuralNetwork(outputmultiheaddecoder) ##output shape is (batch_size x (output_dec_len - split_len) x 1)

Compute Loss on the mask value output of the decoder
    Back-propagation
    ###

FIG. 8 — 800

1. Transpose encoder Input to (1 x batch_size x (input_enc_len x embed_dim))
2. Compute Query, Key, Value vectors
3. Scores softmax(Q*K.T/sqrt(d)) #d is the dimension query vector
4. Output Vector Sum of Scores of Value Vector.
5. Output vector dimension : (1 x batch_size x input_enc_len)

FIG. 9 — 900

1. Compute Query, Key, Value vectors
2. Create J Eigen vector from Key and consider top p eigen values ## p is top eigen values where p is median(J)
3. Compute J'= Query*J
4. scores = Softmax(J'* Query/sqrt(dimension of J))
5. Output is sum of scores*Value
6. Return Key and Value vectors

MULTI-LEVEL TIME SERIES FORECASTING USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for data processing using such systems.

BACKGROUND

Time series forecasting generally involves leveraging historical data to determine patterns and make related forecasts associated with a given time horizon and subject matter context. However, conventional techniques are commonly time-intensive and include significant memory complexity.

SUMMARY

Illustrative embodiments of the disclosure provide techniques for multi-level time series forecasting using artificial intelligence techniques. An exemplary computer-implemented method includes determining one or more entity-related features and one or more temporal features from at least a portion of one or more sets of time series data pertaining to at least one entity, and creating multiple embeddings by encoding at least a portion of the one or more entity-related features and at least a portion of the one or more temporal features using at least one artificial intelligence-based embedding technique. The method also includes processing the multiple embeddings using at least one neural network-based attention technique, and generating one or more data forecasts across one or more temporal granularity levels by processing at least a portion of results from the processing of the multiple embeddings using at least one artificial intelligence-based categorization technique. Further, the method includes performing one or more automated actions based at least in part on the one or more data forecasts.

Illustrative embodiments can provide significant advantages relative to conventional time series forecasting techniques. For example, problems associated with delays and significant memory complexity are overcome in one or more embodiments through automatically generating time series data forecasts across multiple temporal granularities using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 6 shows an example workflow of model prediction in an illustrative embodiment.

FIG. 7 shows example pseudocode for long-range time series forecasting in an illustrative embodiment.

FIG. 8 shows example pseudocode for implementing intra-sample attention in an illustrative embodiment.

FIG. 9 shows example pseudocode for implementing eigen-value-based attention in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
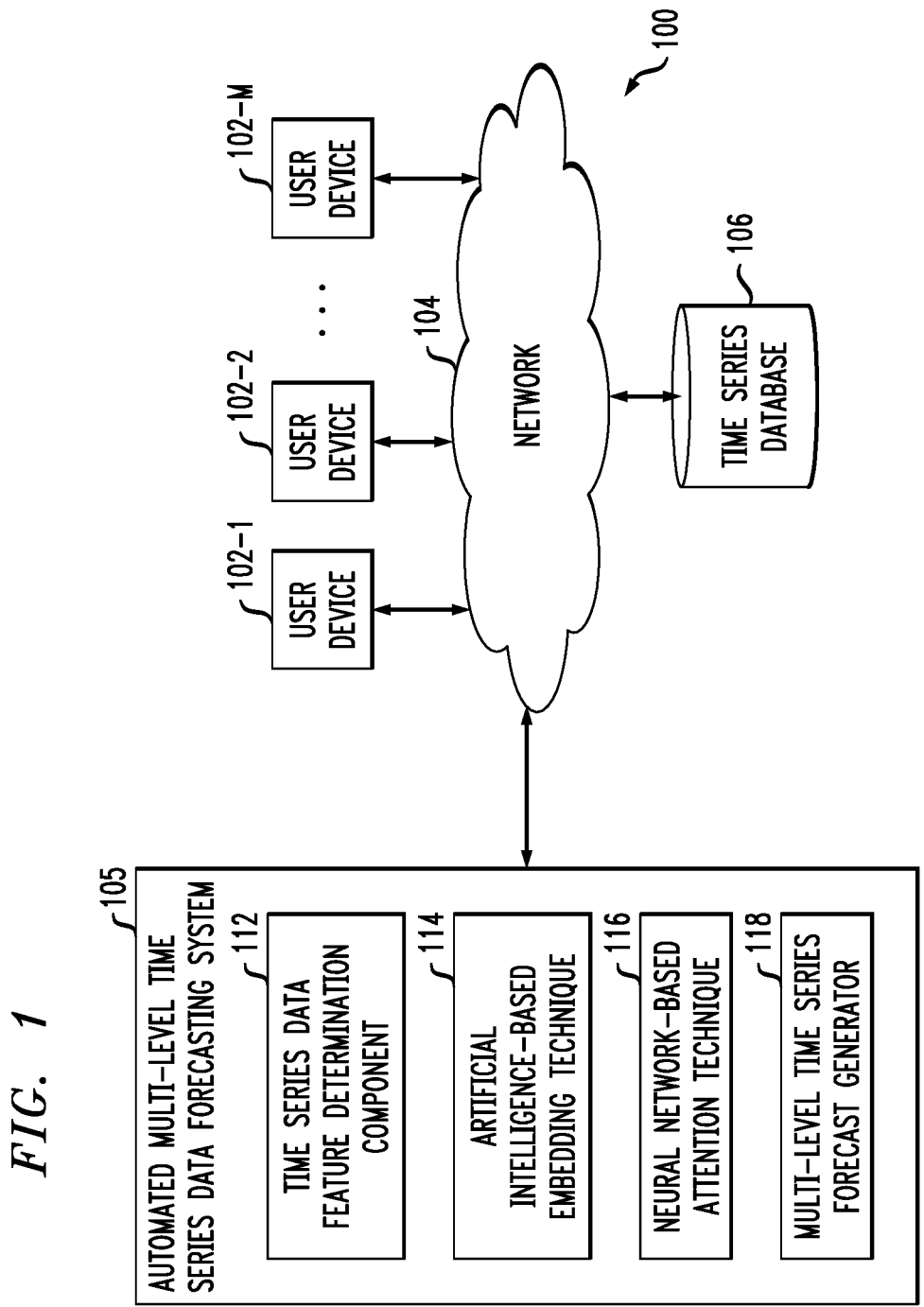
FIG. 1 shows an information processing system configured for multi-level time series forecasting using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated multi-level time series data forecasting system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (TP) or other related communication protocols.

Additionally, automated multi-level time series data forecasting system 105 can have an associated time series database 106 configured to store data pertaining to time series data samples pertaining to one or more entities and/or other users and across multiple temporal granularities, which comprise, for example, embedding information, forecast information, historical time series data, etc.

The time series database 106 in the present embodiment is implemented using one or more storage systems associated with automated multi-level time series data forecasting system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated multi-level time series data forecasting system 105 are one or more input-output devices, which illustratively comprise keyboards, displays or other types of input-output devices in any combination. Such input-output devices can be used, for example, to support one or more user interfaces to automated multi-level time series data forecasting system 105, as well as to support communication between automated multi-level time series data forecasting system 105 and other related systems and devices not explicitly shown.

Additionally, automated multi-level time series data forecasting system 105 in the FIG. 1 embodiment is assumed to be implemented using at least one processing device. Each such processing device generally comprises at least one processor and an associated memory, and implements one or more functional modules for controlling certain features of automated multi-level time series data forecasting system 105.

More particularly, automated multi-level time series data forecasting system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated multi-level time series data forecasting system 105 to communicate over the network 104 with the user devices 102, and illustratively comprises one or more conventional transceivers.

The automated multi-level time series data forecasting system 105 further comprises time series data feature determination component 112, artificial intelligence-based embedding technique 114, neural network-based attention technique 116, and multi-level time series forecast generator 118.

It is to be appreciated that this particular arrangement of elements 112, 114, 116 and 118 illustrated in the automated multi-level time series data forecasting system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for multi-level time series forecasting using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated multi-level time series data forecasting system 105 and time series database 106 can be on and/or part of the same processing platform.

An exemplary process utilizing elements 112, 114, 116 and 118 of an example automated multi-level time series data forecasting system 105 in computer network 100 will be described in more detail with reference to the flow diagram of FIG. 10.

Accordingly, at least one embodiment includes implementing automated multi-level long horizon time series forecasting (LHTSF) using at least one custom transformer-based algorithm (such as detailed, for example, in connection with FIG. 7). By way merely of example, to plan for future headcount requirements of order processing (OP) and query incident management (QIM) agents, one or more embodiments include forecasting total order sales volume and OP orders. However, in an example use case and/or context, thousands of orders can be received on a daily basis, and such orders can originate from various geographic regions and pertain to various enterprise segments.

Accordingly, at least one embodiment includes, for example, forecasting total sales with improved accuracy over a longer time horizon at multiple granularity levels. Such an embodiment, as further detailed herein, is based at least in part on combining knowledge from intra-sample attention and eigen-score-based attention. As used herein, in one or more embodiments, intra-sample attention refers to an algorithm that performs attention on at least one batch dimension by modifying the input from batch_size×sequence_length×embed_dim to 1×batch_size×(sequence_length*embed_dim). In other words, implementing intra-sample attention can include identifying useful information across samples of a batch.

As also used herein, in one or more embodiments, eigen-score-based attention refers to an algorithm that optimizes the process of multi-head attention using the concept of eigen-values for key vectors. Based on the eigen-values, the algorithm considers given (e.g., important) information, which reduces the time complexity of transformers and also helps in noise reduction.

As further detailed herein, one or more embodiments include implementing entity embedding of categorical variables, inter-sample attention, eigen-score-based attention and one-shot learning. As used herein, entity embedding refers to a process of converting categorical features into numerical embeddings using one or more neural networks, which facilitates consideration of context information while creating numerical embeddings. In at least one embodiment, entity embedding is used to create inputs for one or more of the models detailed herein at one or more levels of granularity. As also used herein, one-shot learning includes training a model in a single time stamp t (e.g., wherein training is not dependent on prediction sequence length), which is in contrast to conventional learning techniques which utilize t+n (wherein t is the current time and n is the prediction sequence length).

A model used in such an embodiment can be implemented in connection with relevant historical data and used to forecast at multiple granular levels for a given future period of time (e.g., multiple enterprise quarters, calendar months and/or years, etc.). This forecasting at long time horizons can facilitate and/or improve multiple technical and enterprise-related objectives (e.g., objectives related to modifications to and/or requirements for various resources in connection with systems and/or enterprise units). Moreover, beyond the implementations described herein merely as example illustrations, one or more embodiments can include implementation in connection with various other use cases and/or contexts (e.g., uses cases related to and/or utilizing time series data at multiple granular levels and/or ordinal levels, such as in connection with electricity consumption planning, manufacturing production planning, energy and smart grid management, sensor network monitoring, etc.).

As also detailed herein, one or more embodiments include training and/or implementing an artificial intelligence-based algorithm which processes given data and learns one or more patterns to achieve accurate long-range forecasts. In such an embodiment, the concept of fractioning of information across time periods is utilized in forecasting variables (e.g., purchase orders) that have long-range dependency. As used herein, fractioning refers to filtering the knowledge transfer from one period to another period, and it can be carried out, for example, using intrasample attention. Additionally, the forecasting model can extract knowledge from historical data along with information from within the given time period to produce an accurate forecast, and to reduce the training and inference time of the model, one-shot learning prediction techniques are used, as further described herein.

At least one embodiment includes implementing multiple components as part of a solution, wherein such components can include the structure of the input and output to drive one-shot learning prediction and creation of an entity (e.g., converted categorical features to numerical features) and temporal features (e.g., data preprocessing techniques), combining the knowledge of inter-sample information with intra-sample information (e.g., implementation of a model), an eigenvalue-based attention mechanism to reduce time, cost, and memory consumption (e.g., an encoder layer), and one-shot learning prediction to reduce inference time (e.g., model prediction).

Figure 2:
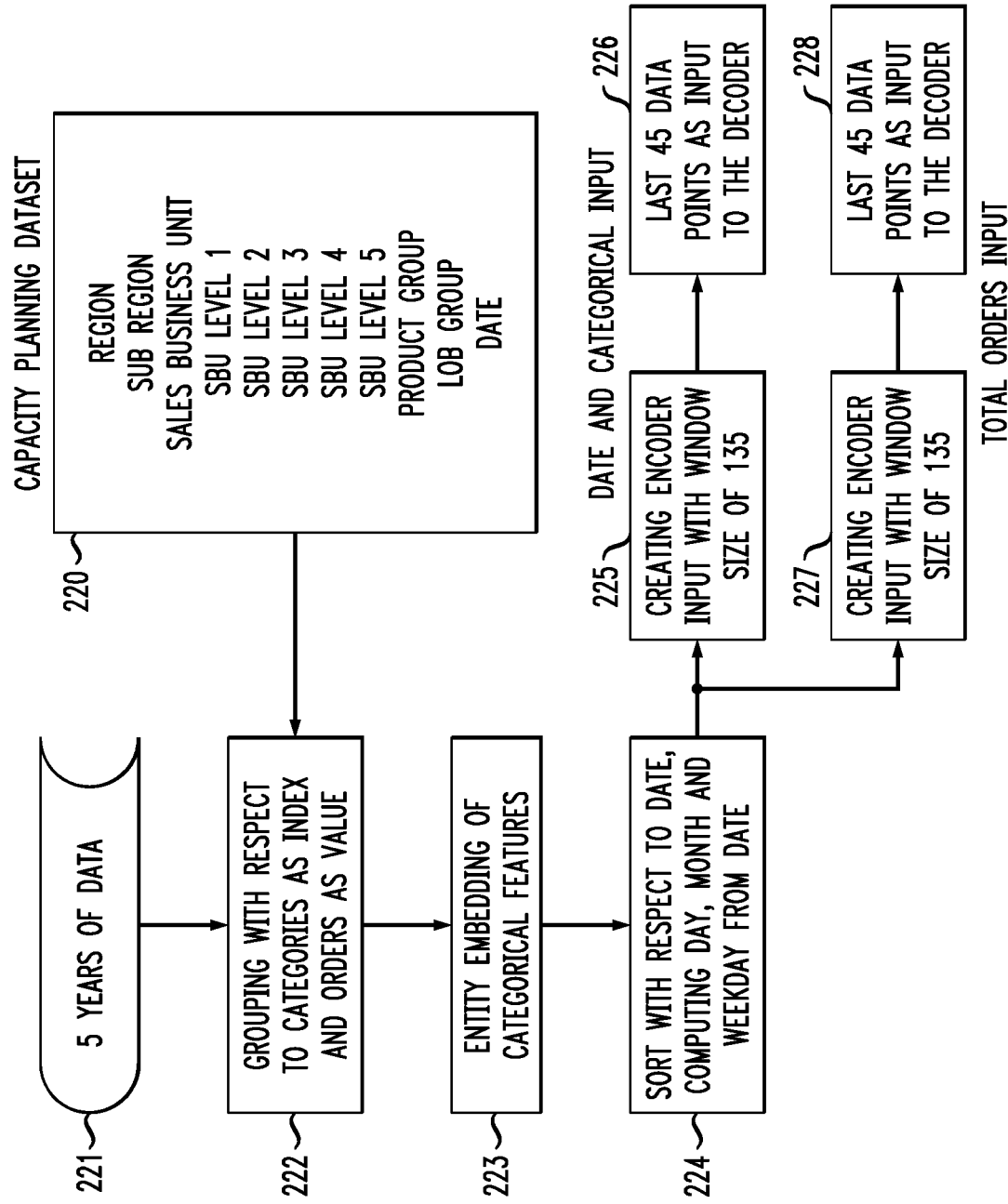
FIG. 2 shows an example workflow for data preprocessing in an illustrative embodiment.

FIG. 2 shows an example workflow for data preprocessing, such as carried out, for example, by time series data feature determination component 112 and artificial intelligence-based embedding technique 114, in an illustrative embodiment. In connection with data preprocessing, consider an example use case with a capacity planning dataset 220 which contains total sales volume data along with various categorical columns such as region, sub-region, segments, management production level, product group, brand category, etc. Also, in furtherance of such an example, assume that five years of historical data 221 (e.g., data captured on a daily basis) is partitioned and used as training data and/or validation data for a forecasting model. In one or more embodiments, such historical data can be preprocessed prior to being used as training data and/or validation data. Also, the above-noted partitioning of the data can include grouping the data (such as depicted in step 222) with respect to the noted categories as an index (e.g., the granularity in which the forecast needs to be provided to the user and/or enterprise) and orders as the corresponding value(s).

In connection with the example use case of FIG. 2, one or more embodiments can also include, for example, considering regional level sales projected for all sub-categories. For encoding the categorical variables, such an embodiment includes using entity embedding (such as denoted in step 223), a neural network-based architecture, which learns the correlation across categories and/or categorical features. In such an embodiment, one-hot vectors are created for the categorical features and passed to the embedding layer, which can constitute a single layer where embeddings are learned in conjunction with model training. Accordingly, in such an example embodiment, day, week and month information can be extracted from the date column(s) and sorted in step 224.

In step 225, as the problem in question is a time series-based problem, encoder input in the form of batches is created, wherein each element in a batch is the window of a sequence length of 135 (e.g., it is to be noted that this sequence length value can be modified based on the forecast period, availability of data, etc.). Also, such encoder input can contain at least a portion of the information (also referred to herein as keys) created in step 224. In step 226, from the window size of 135, the last 45 data points are given to the decoder as a start of a sequence such that the decoder can forecast for the next forecast period. Also, such decoder input can contain the keys that are created in step 224. Step 227 is similar to step 225, except that step 227 includes creating encoder input which contains the number of orders corresponding to the keys in step 225. Also, step 228 is similar to step 226, except that step 228 includes creating decoder input which contains the number of orders corresponding to at least a portion of the information (also referred to herein as keys) in step 226. As used herein, keys refer to combinations of granularities that are present in given data. For example, assume an example scenario wherein there are three columns (e.g., a date column, a region column, and an orders column) in a given set of data. From the first column (e.g., the date column), additional features are created (e.g., day, week, month, etc.), and such features as well as the second column (e.g., the region column) form the keys in this example. In other words, except for the third column (e.g., the orders column), the remaining features (or granularities) are the keys.

Figure 3:
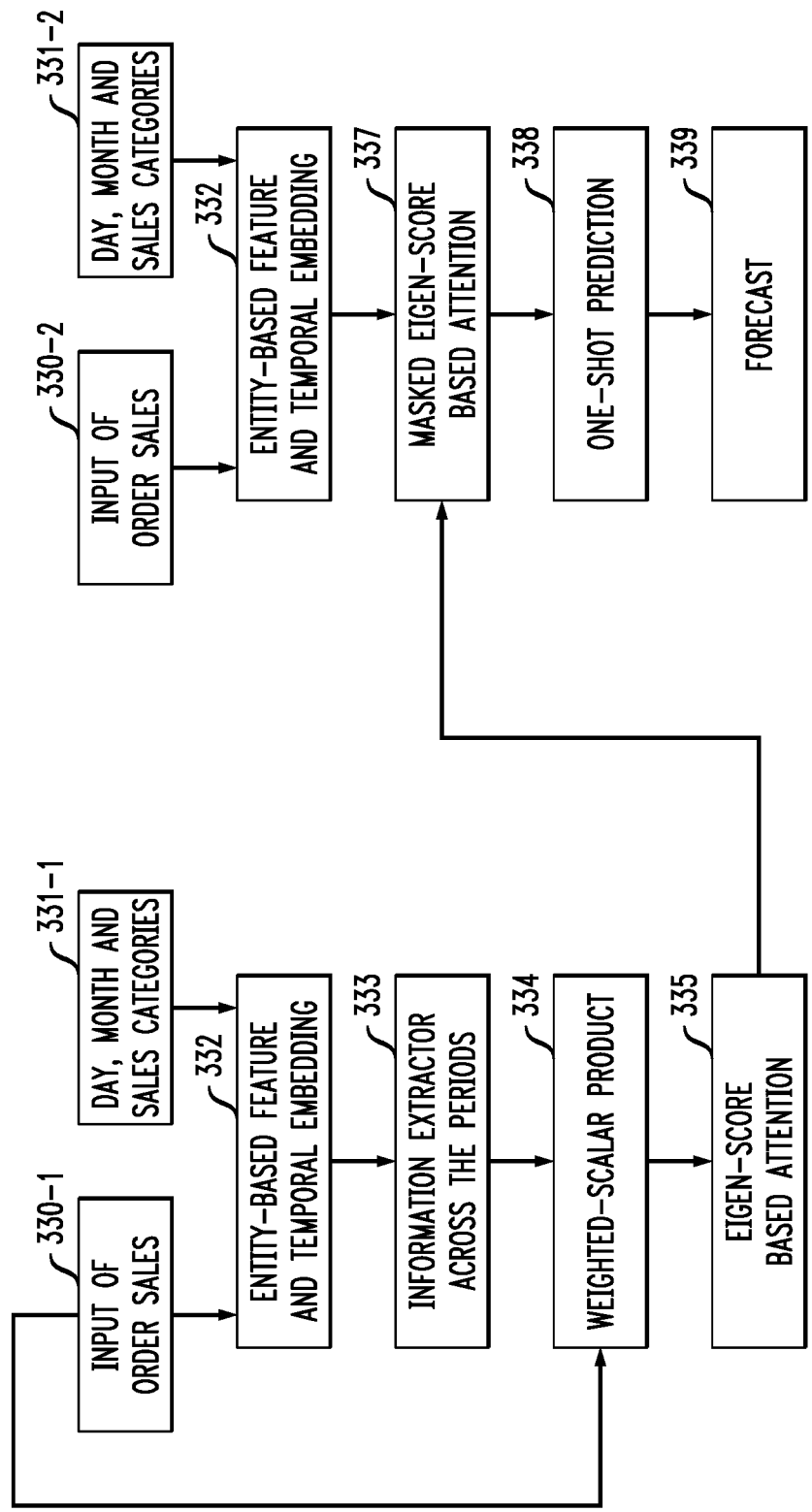
FIG. 3 shows example architecture for generating time series forecasts in an illustrative embodiment.

FIG. 3 shows example architecture for generating time series forecasts, such as carried out, for example, by neural network-based attention technique 116 and multi-level time series forecast generator 118, in an illustrative embodiment. By way of illustration, FIG. 3 depicts an input of order sales 330-1 and category information 331-1 (e.g., day, month, sales, etc.), which are processed and/or used to create one or more entity-based features and temporal embeddings 332. As noted herein, in one or more embodiments, one-hot vectors can be created for the categorical features and passed to the embedding layer, which can encompass a single layer wherein embeddings are learned in conjunction with model training. The entity-based feature(s) and temporal embedding(s) 332 are then used and/or processed by an information extractor 333 to extract information (e.g., using intra-sample attention) across the given temporal periods, wherein such information is then used, in conjunction with at least a portion of the order sales input 330-1, to generate a weighted scalar product 334. In at least one embodiment, the output of intra-sample attention is a collection of weighted information across the samples in a batch. Then this output is multiplied to the actual encoder input to determine and/or obtain the weighted scaler product of the encoder input.

The weighted scalar product 334 is the used by an eigen-score-based attention mechanism 335, which generates one or more eigen-vectors and one or more corresponding eigen-values, and transfers such outputs (e.g., via a knowledge transfer) to a masked eigen-score-based attention mechanism 337.

As also depicted in FIG. 3, the masked eigen-score-based attention mechanism 337, which also receives inputs from entity-based feature(s) and temporal embedding(s) 332 (which were derived from order sales input 330-2 and category information 331-2), provides input to one-shot learning prediction component 338, which ultimately generates the time series forecast 339.

In at least one embodiment, a motivation for long-range time series forecasting is highlighted from encoder-decoder-based machine translation tasks. In such an embodiment, an architecture for forecasting can include at least one encoder and at least one decoder, as further detailed herein.

Figure 4:
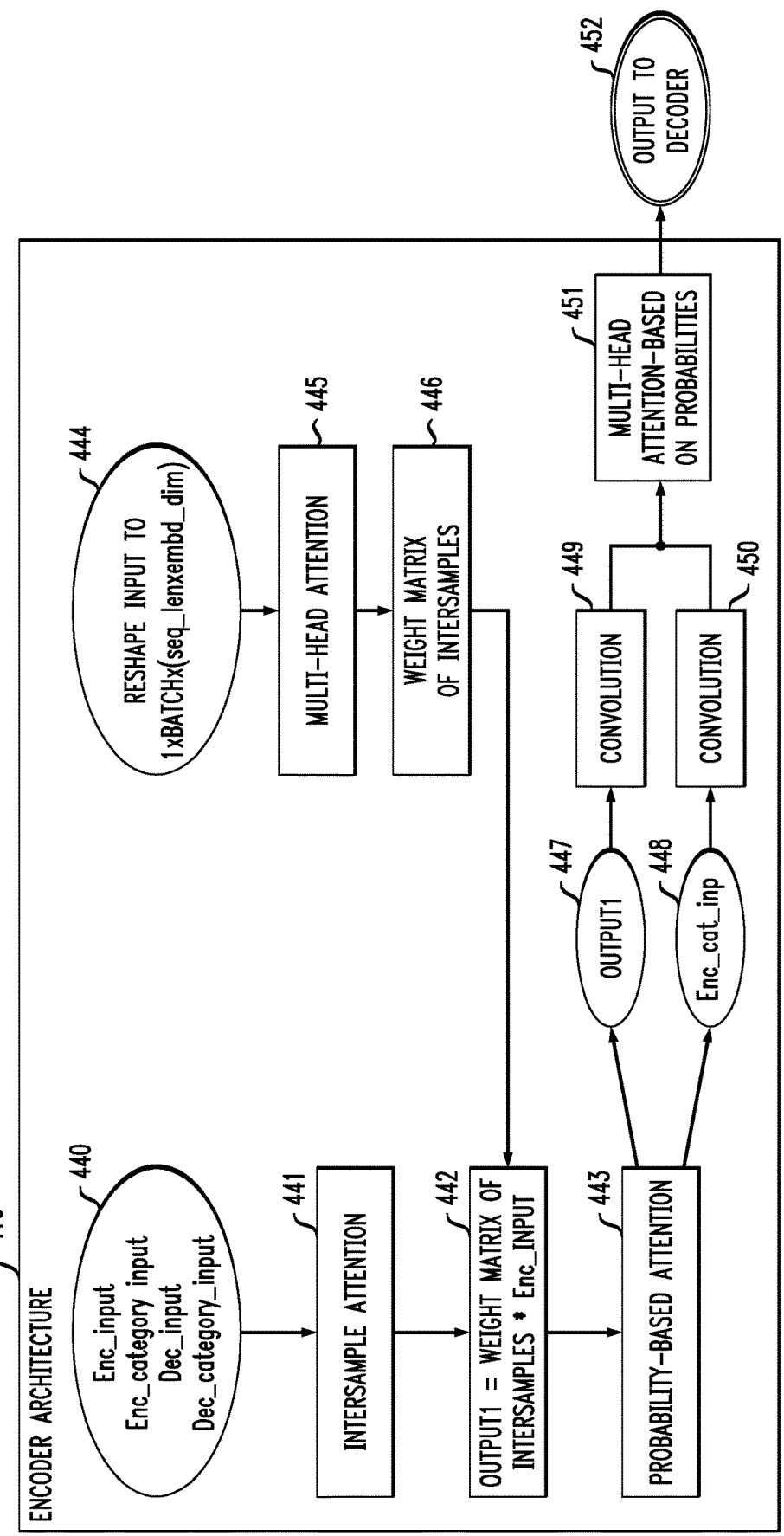
FIG. 4 shows example encoder architecture in an illustrative embodiment.

FIG. 4 shows example encoder architecture, such as carried out, for example, by neural network-based attention technique 416, in an illustrative embodiment. By way of illustration, FIG. 4 depicts element 440, which includes encoder input, encoder category input, decoder input, and decoder category input. Element 440 is processed using inter-sample attention 441, generating an output in the form of element 442, which includes a weight matrix of inter-samples and the encoder input. Additionally, element 442 is then processed using probability-based attention 443.

As also depicted in FIG. 4, the flow of data among elements 444, 445 and 446 describes actions being carried out by inter-sample attention 441. For example, such a flow includes reshaping input to at least one given format (e.g., 1×batch×(seq_len×embed_dim)) using element 444, and processing element 444 using multi-head attention 445 to generate element 446, which includes a weight matrix of inter-samples (which is provided to and/or utilized as part of element 442). Further, as depicted in FIG. 4, the flow of data among elements 447, 448, 449, 450, and 451 describes actions being carried out by probability-based attention 443. For example, element 447 includes at least a portion of the output (derived from element 442) generated by inter-sample attention 441, and element 447 is processed using convolution network 449. Also, element 448 includes at least a portion of the encoder category input (derived from element 440), and element 448 is processed by convolution network 450. In one or more embodiments, convolution network 449 and convolution network 450 are the same convolution network. Also, the outputs from convolution network 449 and convolution network 450 are processed using multi-head attention 451 (which is based on probabilities) to generate an output 452 to be provided to and/or processed by the decoder (such as further detailed, for example, in connection with FIG. 7).

As noted above and further detailed herein, one or more embodiments include selecting and/or processing fractions of information across multiple samples and implementing probability-based multi-head attention using eigenvalues and eigenvectors. To reduce the training and inference time, such an embodiment can also include utilizing one-shot learning techniques.

Figure 5:
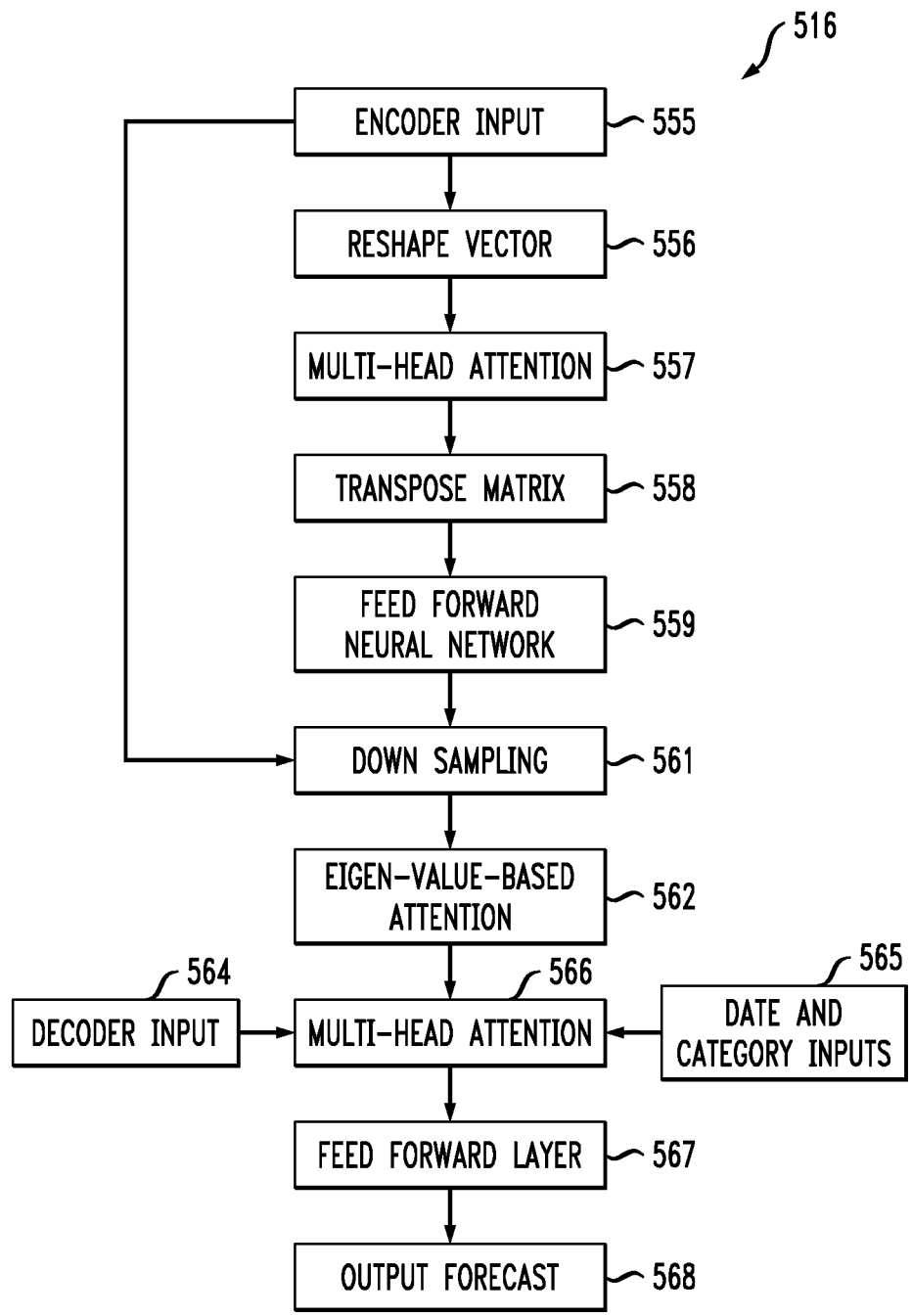
FIG. 5 shows example encoder and decoder architecture in an illustrative embodiment.

FIG. 5 shows example encoder and decoder architecture, such as carried out, for example, by neural network-based attention technique 516, in an illustrative embodiment. As depicted in FIG. 5, encoder input 555 (e.g., 16×[0,90]× embed_dim) is used in step 556 to reshape at least one vector (e.g., reshape a vector to 1×16×(multiply(seq_len, embed_dim)). The reshaped vector produced in step 556 is processed in step 557 using multi-head attention to generate an output shape (e.g., a 1×16×seq_len matrix). Step 558 includes transposing the matrix/output shape (e.g., transposing to 16×seq_len×1), and then processing the transposed matrix, in step 559, using a feed forward neural network (producing an output such as, for example, 16×seq_len_embed_dim). The output produced in step 559, as well as at least a portion of encoder input 555, are processed, in step 561, using down sampling techniques (generating an output such as, for example, 16, seq_len_embed_dim/4). Further, the output produced by step 561 is then processed in step 562 using eigen-value-based attention (e.g., producing an output such as 16×seq_len×embed_dim).

More specifically, using eigen-value-based attention in step 562 can include the following sequence of sub-steps. Initially, query (Q), key (K), and one or more value weight metrics can be determined and/or generated. Next, an eigen-value vector (J) is created from K and a given portion of the eigen-values, e.g., the top N eigen-values, is considered and/or identified. Relatedly, a second version of the eigen-value vector (J') can be computed as Q*J, and N (i.e., the considered and/or identified number of eigen-values) can be computed as max(J')−median(J'). Further, an eigen-value matrix is created from Q the top N eigen-values are selected, and a softmax function (e.g., similar to multi-head attention) is applied thereto.

Referring again to FIG. 5, output from step 562, in conjunction with decoder input 564 (e.g., 16×[45:90]×embed_dim) as well as date and category inputs 565, are processed using multi-head attention in step 566. The output from step 566 is then processed using feed forward layer 567, which generates an output forecast 568 (e.g., a forecast for the next 90 days).

At least one embodiment can also include implementing batch-normalization, L2 regularization, early stopping, and/or cyclic learning scheduling to improve model performance. As used herein, batch normalization refers to a method used to make artificial neural networks faster and more stable through normalization of the layers' inputs by re-centering and re-scaling. Additionally, as used herein, L2 regularization refers to the squared magnitude of weights being added as coefficients to at least one penalty term for the loss function. Also, early stopping, as used herein, refers to a regularization technique that avoids overfitting when training, and cyclic learning scheduling refers to a learning rate that can oscillate back and forth between two bounds when training, increasing the learning rate after every batch update. By way merely of example, in one or more embodiments, the model can be evaluated to attain a mean squared error of approximately 0.18 and a mean absolute error of approximately 0.11. These error values represent example metrics used for regression-based problems and quantify the average deviation from the actual.

FIG. 6 shows an example workflow of model prediction, such as carried out, for example, by multi-level time series forecast generator 618, in an illustrative embodiment. By way of illustration, FIG. 6 depicts starting the workflow in step 671 and reading in and/or processing input data 670 in step 672. As depicted in the FIG. 6 example, input data 670 can include encoder input in the form of the last 90 combinations of total orders, encoder input in the form of the last 90 combinations of categorical data, decoder input in the form of the last 45 combinations of total orders, decoder input in the form of the last 45 combinations of categorical data, and decoder input in the form of categorical input along with dates for predictions of the next 45 combinations. Based at least in part on reading in and/or processing such data, step 673 includes performing a model prediction (such as further detailed, for example, in connection with FIG. 7), which can include a forecast of the total number of orders for 45 combinations 674. Such a forecast can be stored in database 606 and also provided with the next set of inputs in step 676 for a subsequent iteration of model prediction.

In at least one embodiment, a model prediction can include a one-shot prediction considering each combination (e.g., each particular granularity at which forecasting is being carried out) as a single step. The predictions can be performed at a granular level for the next time period (e.g., the next enterprise quarter, the next month, etc.).

Also, as noted herein, one or more embodiments include creating embeddings from entity-based features and temporal features. Additionally, a common challenge of long-range forecasting includes predicting for longer time horizons with less inference time. However, at least one embodiment includes creating input and output vectors for a model that facilitates faster training, and implementing one-shot learning prediction techniques for longer range forecasting at granular levels. Such an embodiment can include handling an ordinality of multiple unique categories (e.g., thousands of unique categories) with higher accuracies than conventional approaches, and the preprocessing pipeline of such an embodiment can be generalized for any given use case of long-range forecasting.

As also detailed herein, eigen-score-based attention mechanisms can be implemented to reduce time and memory complexity of the neural architecture of at least one model. A solution, such as detailed herein in connection with one or more embodiments, is optimized by performing the computation only on the filtered samples (instead of all of the samples), and this reduction in used and/or needed samples reduces the time and memory consumed by the model. Relatedly, it is noted that one important block in a transformer is the multi-head attention block (e.g., the multi-head attention mechanism determines and/or identifies the important information that can be used for explaining the importance within a given sample, and also filters out the unnecessary noise in the sample), and one or more embodiments include using eigen-score-based attention as a replacement for multi-head attention in time series forecasting (e.g., because the attention is carried out on those vectors that contain maximum information). Such an embodiment also includes reducing time complexity and memory consumption by storing only the eigenvectors that have more information across the axes (e.g., the eigen-vectors). Such actions reduce the size of the key matrix, which is used in the attention mechanism, while at the same time retaining maximum information.

At least one embodiment includes calculating eigenvectors and eigenvalues of the key matrix (e.g., a matrix that is used in transformers which has the information of an input provided). Eigenvectors provide the direction(s) in which data are dispersed in the key matrix, and eigenvalues provide the relative importance (with respect to the elements within the key matrix) of these different directions. In one or more embodiments, a higher eigenvalue implies higher variance (e.g., variance within the columns of a K vector matrix) and therefore a more important principal component.

Such as detailed, for example, in connection with FIG. 5 (as well, for example, in connection with FIG. 9), a given number of eigenvalues (e.g., the top-N eigenvalues) are selected and an eigenvector matrix is constructed based at least in part thereon. In such an embodiment, a J matrix is computed via matrix multiplication between the given key matrix and the top-N eigenvector matrix, and this J matrix closely represents the key matrix while having reduced dimensions. Such a J matrix can be used as an attention mechanism, and because the J matrix has reduced dimensions, the attention mechanism operations can result in reduced time and memory complexity in the associated neural architecture.

Also, as detailed herein, one or more embodiments include selecting and/or processing fractions of information across multiple samples and eigen-score-based attention mechanisms in an encoder. In time series forecasting, the future depends at least in part on the information transfer from the past across samples, and the remaining information can be treated as noise. This helps to attain given levels of accuracy in forecasting problems as the model is fed with only the weighted intra-sample information.

Relatedly, in time series forecasting for longer time horizons, in order to have sufficient accuracy, one or more embodiments include capturing, via the model, precise long-range dependency coupling between input and output. Additionally or alternatively, in such an embodiment, at least one multi-head attention mechanism is applied across batches of data to calculate an attention score by identifying correlated batches. This can facilitate building long-term dependency between batches and enable the model to predict and/or forecast for longer time horizons with sufficient accuracy.

The steps involved in such an embodiment can include, for example, the following. Encoded input is received by an encoder block, and this input matrix size can be as follows: (batch_size, sequence_length, embed_dim). The shape of the input tensor is transformed to (1, batch_size, sequence_length*embed_dim), and then is passed to a feed forward layer, which obtains and/or generates the output with a shape of (1, batch_size, 512). Subsequently, multi-head attention is applied to calculate the attention score based at least in part on similarity between batches. Once the attention is applied, the shape is transformed back to the original shape.

As also detailed herein, one or more embodiments include implementing a mechanism of one-shot learning prediction in a decoder for multi-level forecasting (e.g., multi-level capacity planning). For decoding, such an embodiment includes providing the start of a given sequence to the decoder which predicts time step 1, then the output at time step 1 is given as input to time step 2, and so on. To avoid error propagation within the decoder, at least one embodiment includes using one-shot learning prediction in a time series context. In such an embodiment, the last period of the encoder is given as input to the decoder, which generates one-shot learning predictions for longer durations at higher granularity and ordinality.

Further, during inference time, the model processes historical data derived from the previous period (e.g., the past 45 days, etc.) at a given granular level. Also, the decoder is fed with the forecast inputs at the given granular level (e.g., the next 90 days, etc.).

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

FIG. 7 shows example pseudocode for long-range time series forecasting in an illustrative embodiment. In this embodiment, example pseudocode 700 is executed by or under the control of at least one processing system and/or device. For example, the example pseudocode 700 may be viewed as comprising a portion of a software implementation of at least part of automated multi-level time series data forecasting system 105 of the FIG. 1 embodiment.

The example pseudocode 700 illustrates a set of initialization steps including inputting sequence length to the encoder (e.g., inp_enc_len), inputting sequence length to the decoder (e.g., out_dec_len), splitting the size/length for the start of the sequence to the decoder (e.g., split_len), defining an embedding dimension (e.g., embed_dim) and a batch size. Accordingly, as illustrated in example pseudocode 700, encoder input can include (batch_size×[0:inp_enc_len]×embed_dim), and decoder input can include (batch_size×[split len:out_dec_len]×embed_dim).

Example pseudocode 700 also depicts model encoder details including an inter-sample attention output (e.g., output_intersample=IntrasampleAttention(EncoderInput), wherein the output shape is (1×batch_size×input_enc_len)), as well as a transposed vector (e.g., Transpose(output_intersample), wherein such a function transforms the shape into batch_size×input_enc_len×1). Additionally, model encoder details include feed-forward output (e.g., output_feedforward=FeedForwardNeuralNetwork(transposed_vector), wherein output_feedforward is batch_size× input_enc_len×embed_dim), a noise-filtered vector (e.g., noise_filtered_vector=batchmultiplication(EncoderInput, output_feedforward). Model encoder details also include downsampling information, which can include modified feed-forward output (e.g., output_feedforward= FeedForwardNeuralNetwork(noise_filtered_vector), wherein output_feedforward is batch_size×input_enc_len× (embed_dim/4)). Also, model encoder details include key vector and value vector information (e.g., key_vector_encoder, value_vector_encoder=Eigenvaluebasedattention (output_feedforward)).

Example pseudocode 700 additionally depicts model decoder details, including decoder input (e.g., decoder_input=Mask(DecoderInput), multi-head decoder output (e.g., outputmultiheaddecoder=Eigenvaluebasedattention (Key_vector_encoder, Value_vector_encoder, decoder_input), and feed-forward output (e.g., Feedforwardoutput= FeedForwardNeuralNetwork(outputmultiheaddecoder), wherein the output shape is (batch_size×(output_dec_len−split_len)×1)). Also, as depicted in example pseudocode 700, loss can be computed on the mask value output of the decoder, and back-propagation techniques can be implemented. As used herein, masking refers to making the values of the prediction zone outputs as a random vector such that that model can differentiate that from input and output.

It is to be appreciated that this particular example pseudocode shows just one example implementation of long-range time series forecasting, and alternative implementations of the process can be used in other embodiments.

FIG. 8 shows example pseudocode for implementing intra-sample attention in an illustrative embodiment. In this embodiment, example pseudocode 800 is executed by or under the control of at least one processing system and/or device. For example, the example pseudocode 800 may be viewed as comprising a portion of a software implementation of at least part of automated multi-level time series data forecasting system 105 of the FIG. 1 embodiment.

The example pseudocode 800 illustrates steps associated with implementing intra-sample attention in connection with encoder input. In the first step, the encoder input is transposed to (1×batch_size×(input_enc_len×embed_dim)). As used here, transposing the input means changing and/or swapping the dimensions of a matrix (e.g., changing columns to rows and/or rows to columns in a matrix). In the second step, query (Q), key (K), and value vectors are computed. In the third step, a score is determined using softmax(Q*K. T/sqrt(d)), wherein d is the dimension query vector and T is the transpose of the K matrix. Accordingly, in the equation, the Q matrix is multiplied by the transpose of the K matrix, and that product is divided by square root of the dimension query vector.

In the fourth step, a vector sum of scores of the value vectors is generated and/or output, and in the fifth step, a vector dimension (e.g., ((1×batch_size×input_enc_len)) is output. Accordingly, the shape of the tensor is changed to 1*batch_size*input_enc_len, which allows the attention mechanism to be applied across all of the batches.

It is to be appreciated that this particular example pseudocode shows just one example implementation of intra-sample attention, and alternative implementations of the process can be used in other embodiments.

FIG. 9 shows example pseudocode for implementing eigen-value-based attention in an illustrative embodiment. In this embodiment, example pseudocode 900 is executed by or under the control of at least one processing system and/or device. For example, the example pseudocode 900 may be viewed as comprising a portion of a software implementation of at least part of automated multi-level time series data forecasting system 105 of the FIG. 1 embodiment.

The example pseudocode 900 illustrates steps associated with implementing eigen-value-based attention in connection with feed-forward output. In the first step, query (Q), key (K), and value vectors are computed. In the second step, an eigen-vector (J) is created from the key vector and the top p eigen-values are considered, wherein p represents the median of the top eigen-values. In the third step, J' is computed as Q*J, and in the fourth step, scores are generated using softmax(J' *Q/sqrt(dimension of J)). In the fifth step, the sum of the scores*values is generated and/or output, and in the sixth step, the key and value vectors are returned.

It is to be appreciated that this particular example pseudocode shows just one example implementation of eigen-value-based attention, and alternative implementations of the process can be used in other embodiments.

Figure 10:
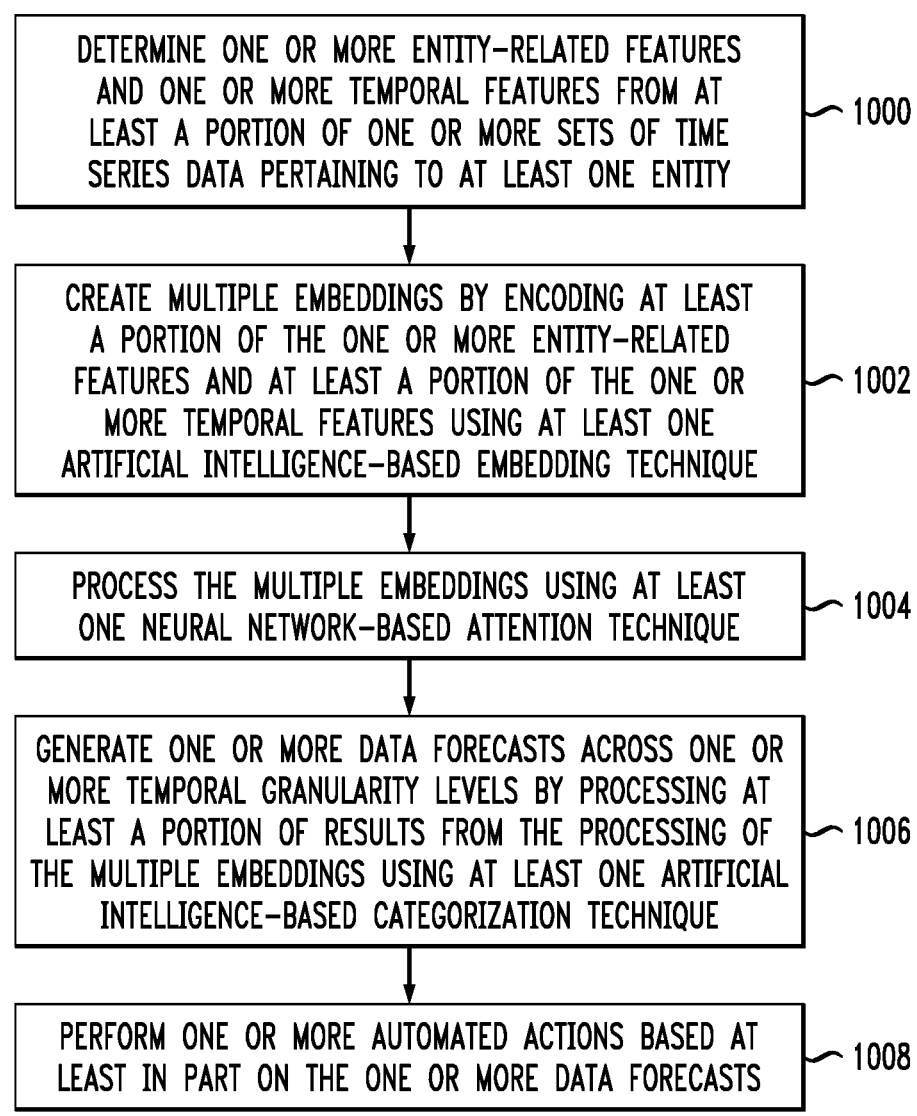
FIG. 10 is a flow diagram of a process for multi-level time series forecasting using artificial intelligence techniques in an illustrative embodiment.

FIG. 10 is a flow diagram of a process for multi-level time series forecasting using artificial intelligence techniques in an illustrative embodiment. It is to be understood that this particular process is only an example, and additional or alternative processes can be carried out in other embodiments.

In this embodiment, the process includes steps 1000 through 1008. These steps are assumed to be performed by the automated multi-level time series data forecasting system 105 utilizing its elements 112, 114, 116 and 118.

Step 1000 includes determining one or more entity-related features and one or more temporal features from at least a portion of one or more sets of time series data pertaining to at least one entity. In at least one embodiment, determining one or more entity-related features and one or more temporal features includes selecting fractions of time series data across multiple samples within the one or more sets of time series data.

Step 1002 includes creating multiple embeddings by encoding at least a portion of the one or more entity-related features and at least a portion of the one or more temporal features using at least one artificial intelligence-based embedding technique. In one or more embodiments, encoding at least a portion of the one or more entity-related features and at least a portion of the one or more temporal features using at least one artificial intelligence-based embedding technique includes learning one or more correlations across the one or more entity-related features and the one or more temporal features within the one or more sets of time series data using at least one neural network-based embedding technique. Further, at least one embodiment can include training the at least one artificial intelligence-based embedding technique based at least in part on combining inter-sample information and intra-sample information across multiple samples within the one or more sets of time series data.

Step 1004 includes processing the multiple embeddings using at least one neural network-based attention technique. In at least one embodiment, processing the multiple embeddings using at least one neural network-based attention technique includes generating one or more eigenvectors and one or more corresponding eigenvalues based at least in part on one or more portions of the multiple embeddings. In one or more embodiments, the eigenvectors and eigenvalues are generated and/or calculated (e.g., for K matrix) using Principal Component Analysis.

Step 1006 includes generating one or more data forecasts across one or more temporal granularity levels by processing at least a portion of results from the processing of the multiple embeddings using at least one artificial intelligence-based categorization technique. In one or more embodiments, processing at least a portion of results from the processing of the multiple embeddings using at least one artificial intelligence-based categorization technique includes processing at least a portion of the results from the processing of the multiple embeddings using at least one one-shot learning technique.

Step 1008 includes performing one or more automated actions based at least in part on the one or more data forecasts. In at least one embodiment, performing one or more automated actions includes automatically training the at least one artificial intelligence-based categorization technique based at least in part on the one or more data forecasts. Additionally or alternatively, performing one or more automated actions can include automatically initiating at least one action, in connection with one or more external systems, in response to at least a portion of the one or more data forecasts (e.g., generating one or more control signals to control one or more external systems such as communication processing systems, transaction processing systems, shipping processing systems, etc.).

Accordingly, the particular processing operations and other functionality described in conjunction with the flow diagram of FIG. 10 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement multi-level time series forecasting using artificial intelligence techniques. These and other embodiments can effectively overcome problems associated with delays and significant memory complexity.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
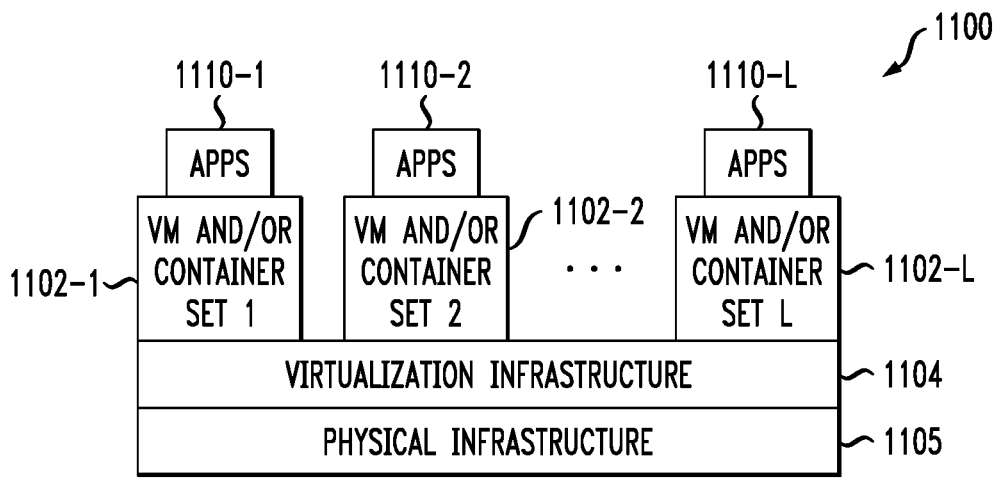
FIGS. 11 and 12 show examples of processing platforms that may be utilized to implement at least a portion of an information processing system in illustrative embodiments.
Figure 12:
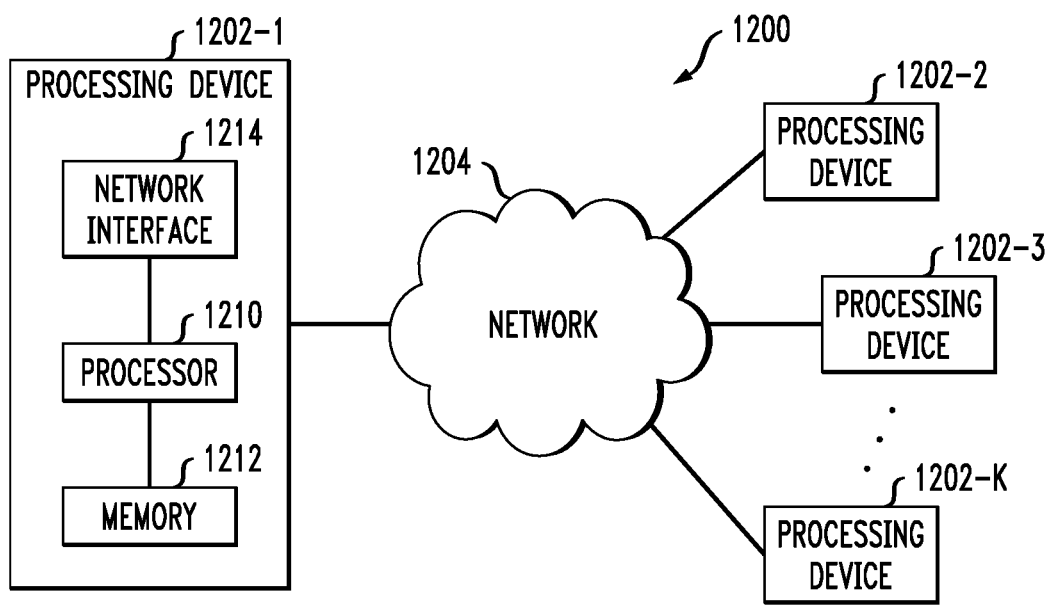

FIG. 11 shows an example processing platform comprising cloud infrastructure 1100. The cloud infrastructure 1100 comprises a combination of physical and virtual processing resources that are utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 comprise respective VMs, respective sets of one or more containers, or respective sets of one or more containers running in VMs. In some implementations of the FIG. 11 embodiment, the VMs/container sets 1102 comprise respective VMs implemented using virtualization infrastructure 1104 that comprises at least one hypervisor.

A hypervisor platform may be used to implement a hypervisor within the virtualization infrastructure 1104, wherein the hypervisor platform has an associated virtual infrastructure management system. The underlying physical machines comprise one or more information processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1202-1 in the processing platform 1200 comprises a processor 1210 coupled to a memory 1212.

The processor 1210 comprises a microprocessor, a CPU, a GPU, a TPU, a microcontroller, an ASIC, a FPGA or other type of processing circuitry, as well as portions or combinations of such circuitry elements.

The memory 1212 comprises random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   determining one or more entity-related features and one or more temporal features from at least a portion of one or more sets of time series data pertaining to at least one entity;
   creating multiple embeddings by encoding at least a portion of the one or more entity-related features and at least a portion of the one or more temporal features using at least one embedding-based neural network comprising at least one embedding layer;
   processing the multiple embeddings using at least one multi-head attention-based neural network comprising at least one intra-sample attention layer, which generates at least one weighted scalar product from one or more portions of the multiple embeddings, and at least one additional attention layer, which generates, using the at least one weighted scalar product, one or more eigenvectors and one or more corresponding eigenvalues;
   generating one or more data forecasts across one or more temporal granularity levels by processing at least a portion of results from the processing of the multiple embeddings using at least one categorization-based neural network comprising at least one feed forward layer; and
   performing one or more automated actions based at least in part on the one or more data forecasts;
   wherein the method is performed by at least one processing device comprising a processor coupled to a memory.

2. The computer-implemented method of claim 1, wherein processing at least a portion of results from the processing of the multiple embeddings using at least one categorization-based neural network comprises processing at least a portion of the results from the processing of the multiple embeddings using at least one one-shot learning technique.

3. The computer-implemented method of claim 1, wherein performing one or more automated actions comprises automatically training the at least one categorization-based neural network based at least in part on the one or more data forecasts.

4. The computer-implemented method of claim 1, wherein performing one or more automated actions comprises automatically initiating at least one action, in connection with one or more external systems, in response to at least a portion of the one or more data forecasts.

5. The computer-implemented method of claim 1, wherein determining one or more entity-related features and one or more temporal features comprises selecting fractions of time series data across multiple samples within the one or more sets of time series data.

6. The computer-implemented method of claim 1, further comprising:
   training the at least one embedding-based neural network based at least in part on combining inter-sample information and intra-sample information across multiple samples within the one or more sets of time series data.

7. The computer-implemented method of claim 1, wherein generating the one or more data forecasts comprises processing the at least a portion of results from the processing of the multiple embeddings using at least one masked eigen-score-based attention mechanism in conjunction with one or more one-shot learning prediction components.

8. A non-transitory processor-readable storage medium having stored therein program code of one or more software programs, wherein the program code when executed by at least one processing device causes the at least one processing device:
   to determine one or more entity-related features and one or more temporal features from at least a portion of one or more sets of time series data pertaining to at least one entity;
   to create multiple embeddings by encoding at least a portion of the one or more entity-related features and at least a portion of the one or more temporal features using at least one embedding-based neural network comprising at least one embedding layer;

to process the multiple embeddings using at least one multi-head attention-based neural network comprising at least one intra-sample attention layer, which generates at least one weighted scalar product from one or more portions of the multiple embeddings, and at least one additional attention layer, which generates, using the at least one weighted scalar product, one or more eigenvectors and one or more corresponding eigenvalues;

to generate one or more data forecasts across one or more temporal granularity levels by processing at least a portion of results from the processing of the multiple embeddings using at least one categorization-based neural network comprising at least one feed forward layer; and to perform one or more automated actions based at least in part on the one or more data forecasts.

9. The non-transitory processor-readable storage medium of claim 8, wherein processing at least a portion of results from the processing of the multiple embeddings using at least one categorization-based neural network comprises processing at least a portion of the results from the processing of the multiple embeddings using at least one one-shot learning technique.

10. The non-transitory processor-readable storage medium of claim 8, wherein performing one or more automated actions comprises automatically training the at least one categorization-based neural network based at least in part on the one or more data forecasts.

11. The non-transitory processor-readable storage medium of claim 8, wherein performing one or more automated actions comprises automatically initiating at least one action, in connection with one or more external systems, in response to at least a portion of the one or more data forecasts.

12. The non-transitory processor-readable storage medium of claim 8, wherein determining one or more entity-related features and one or more temporal features comprises selecting fractions of time series data across multiple samples within the one or more sets of time series data.

13. The non-transitory processor-readable storage medium of claim 8, wherein the program code when executed by the at least one processing device further causes the at least one processing device:

to train the at least one embedding-based neural network based at least in part on combining inter-sample information and intra-sample information across multiple samples within the one or more sets of time series data.

14. An apparatus comprising:

at least one processing device comprising a processor coupled to a memory;

the at least one processing device being configured:

to determine one or more entity-related features and one or more temporal features from at least a portion of one or more sets of time series data pertaining to at least one entity;

to create multiple embeddings by encoding at least a portion of the one or more entity-related features and at least a portion of the one or more temporal features using at least one embedding-based neural network comprising at least one embedding layer;

to process the multiple embeddings using at least one multi-head attention-based neural network comprising at least one intra-sample attention layer, which generates at least one weighted scalar product from one or more portions of the multiple embeddings, and at least one additional attention layer, which generates, using the at least one weighted scalar product, one or more eigenvectors and one or more corresponding eigenvalues;

to generate one or more data forecasts across one or more temporal granularity levels by processing at least a portion of results from the processing of the multiple embeddings using at least one categorization-based neural network comprising at least one feed forward layer; and to perform one or more automated actions based at least in part on the one or more data forecasts.

15. The apparatus of claim 14, wherein processing at least a portion of results from the processing of the multiple embeddings using at least one categorization-based neural network comprises processing at least a portion of the results from the processing of the multiple embeddings using at least one one-shot learning technique.

16. The apparatus of claim 14, wherein performing one or more automated actions comprises automatically training the at least one categorization-based neural network based at least in part on the one or more data forecasts.

17. The apparatus of claim 14, wherein performing one or more automated actions comprises automatically initiating at least one action, in connection with one or more external systems, in response to at least a portion of the one or more data forecasts.

18. The apparatus of claim 14, wherein determining one or more entity-related features and one or more temporal features comprises selecting fractions of time series data across multiple samples within the one or more sets of time series data.

19. The apparatus of claim 14, wherein the at least one processing device is further configured:

to train the at least one embedding-based neural network based at least in part on combining inter-sample information and intra-sample information across multiple samples within the one or more sets of time series data.

20. The apparatus of claim 14, wherein generating the one or more data forecasts comprises processing the at least a portion of results from the processing of the multiple embeddings using at least one masked eigen-score-based attention mechanism in conjunction with one or more one-shot learning prediction components.

* * * * *